United States Patent
Vijayan

(10) Patent No.: US 11,921,679 B2
(45) Date of Patent: *Mar. 5, 2024

(54) SYNCHRONIZING CONFIGURATION OF PARTNER OBJECTS ACROSS DISTRIBUTED STORAGE SYSTEMS USING TRANSFORMATIONS

(71) Applicant: NetApp Inc., San Jose, CA (US)

(72) Inventor: Anoop Chakkalakkal Vijayan, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,313

(22) Filed: Sep. 8, 2022

(65) Prior Publication Data

US 2023/0004531 A1 Jan. 5, 2023

Related U.S. Application Data

(63) Continuation of application No. 16/806,083, filed on Mar. 2, 2020, now Pat. No. 11,442,903, which is a (Continued)

(51) Int. Cl.
*G06F 16/00* (2019.01)
*G06F 3/06* (2006.01)
(Continued)

(52) U.S. Cl.
CPC .......... *G06F 16/178* (2019.01); *G06F 3/0607* (2013.01); *G06F 3/0665* (2013.01);
(Continued)

(58) Field of Classification Search
CPC .... G06F 16/178; G06F 16/27; G06F 16/1827; G06F 16/256; G06F 16/10; G06F 16/128;
(Continued)

(56) References Cited

U.S. PATENT DOCUMENTS 6,466,980 B1 10/2002 Lumelsky et al.
6,625,751 B1 9/2003 Starovic et al.
(Continued)

FOREIGN PATENT DOCUMENTS

EP 2645253 B1 * 11/2014
WO WO2007037984 A2 * 4/2007
(Continued)

OTHER PUBLICATIONS

ZhiHui Lu et al., "TRRR: A Tree-Round-Robin-Replica Content Replication Algorithm for Improving FastReplica in Content Delivery Networks", 2008 4th International Conference on Wireless Communications, Networking and Mobile Computing (pp. 1-4).*
(Continued)

*Primary Examiner* — Srirama Channavajjala
(74) *Attorney, Agent, or Firm* — Cooper Legal Group, LLC

(57) ABSTRACT

A configuration for a component of a primary node is synchronized with a configuration for a component of a partner node in a different cluster by replicating the primary node configuration with the partner node. A baseline configuration replication comprises a snapshot of a component configuration on the primary. The baseline configuration can be generated by traversing through the configuration objects, capturing their attributes and encapsulating them in a package. The baseline package can then be transferred to the partner node. The configuration objects can be applied on the partner node in the order in which they were captured on the primary node. Attributes of the configuration objects are identified that are to be transformed. Values for the identified attributes are transformed from a name space in the primary node to a name space in the partner node.

20 Claims, 8 Drawing Sheets

Related U.S. Application Data continuation of application No. 15/820,743, filed on Nov. 22, 2017, now Pat. No. 10,621,146, which is a continuation of application No. 14/496,611, filed on Sep. 25, 2014, now Pat. No. 9,836,476.

(51) Int. Cl.
| | | |
|---|---|---|
| *G06F 11/00* | (2006.01) | |
| *G06F 11/07* | (2006.01) | |
| *G06F 11/14* | (2006.01) | |
| *G06F 11/16* | (2006.01) | |
| *G06F 11/20* | (2006.01) | |
| *G06F 16/10* | (2019.01) | |
| *G06F 16/11* | (2019.01) | |
| *G06F 16/178* | (2019.01) | |
| *G06F 16/182* | (2019.01) | |
| *G06F 16/25* | (2019.01) | |
| *G06F 16/27* | (2019.01) | |
| *H04L 67/1095* | (2022.01) | |
| *H04L 67/1097* | (2022.01) | |

(52) U.S. Cl.
CPC ........ *G06F 3/0667* (2013.01); *G06F 11/0712* (2013.01); *G06F 11/1484* (2013.01); *G06F 11/1658* (2013.01); *G06F 11/20* (2013.01); *G06F 11/2089* (2013.01); *G06F 16/10* (2019.01); *G06F 16/128* (2019.01); *G06F 16/1827* (2019.01); *G06F 16/256* (2019.01); *G06F 16/27* (2019.01); *H04L 67/1095* (2013.01); *H04L 67/1097* (2013.01)

(58) Field of Classification Search
CPC .... G06F 3/0607; G06F 3/0665; G06F 3/0667; G06F 11/0712; G06F 11/1448; G06F 11/1658; G06F 11/20; G06F 11/2089
See application file for complete search history.

(56) References Cited

U.S. PATENT DOCUMENTS

| | | | |
|---|---|---|---|
| 7,275,142 B1 | 9/2007 | Schultz et al. | |
| 7,865,475 B1 | 1/2011 | Yadav et al. | |
| 8,156,491 B2 | 4/2012 | Dake | |
| 8,341,365 B2 | 12/2012 | Murase et al. | |
| 8,413,147 B2 | 4/2013 | Shen et al. | |
| 8,555,278 B2 | 10/2013 | Janakiraman | |
| 8,966,027 B1 | 2/2015 | Brandwine et al. | |
| 8,966,198 B1 | 2/2015 | Harris et al. | |
| 9,037,818 B1 | 5/2015 | Natanzon et al. | |
| 9,176,829 B2* | 11/2015 | Jain | G06F 11/1484 |
| 9,471,590 B2* | 10/2016 | Venkatesh | G06F 3/067 |
| 9,632,814 B2 | 4/2017 | Bonilla et al. | |
| 9,684,701 B2* | 6/2017 | Bailey | G06F 16/27 |
| 9,836,476 B2 | 12/2017 | Vijayan | |
| 9,870,238 B2 | 1/2018 | Astete et al. | |
| 9,965,306 B1* | 5/2018 | Natanzon | G06F 11/1471 |
| 10,114,834 B2* | 10/2018 | Yin | H04L 67/131 |
| 10,339,111 B2 | 7/2019 | Shetty et al. | |
| 10,423,499 B2 | 9/2019 | Kumar et al. | |
| 10,521,146 B1 | 12/2019 | Tanpairoj et al. | |
| 10,621,146 B2 | 1/2020 | Vijayan | |
| 11,442,903 B2 | 9/2022 | Vijayan | |
| 2004/0117369 A1 | 6/2004 | Mandal et al. | |
| 2004/0221290 A1 | 11/2004 | Casey et al. | |
| 2005/0015407 A1 | 1/2005 | Nguyen et al. | |
| 2005/0065937 A1 | 3/2005 | Degenaro et al. | |
| 2006/0179037 A1 | 8/2006 | Turner et al. | |
| 2006/0277386 A1 | 12/2006 | Eguchi | |
| 2007/0027973 A1 | 2/2007 | Stein et al. | |
| 2008/0059556 A1 | 3/2008 | Greenspan et al. | |
| 2008/0120478 A1 | 5/2008 | Holt | |
| 2008/0155223 A1 | 6/2008 | Hiltgen et al. | |
| 2009/0113420 A1 | 4/2009 | Pawlowski | |
| 2009/0150527 A1 | 6/2009 | Tripathi et al. | |
| 2009/0328225 A1 | 12/2009 | Chambers et al. | |
| 2010/0005465 A1 | 1/2010 | Kawato | |
| 2010/0175070 A1 | 7/2010 | Baba | |
| 2010/0228819 A1 | 9/2010 | Wei | |
| 2010/0325471 A1 | 12/2010 | Mishra et al. | |
| 2011/0022694 A1 | 1/2011 | Dalal et al. | |
| 2011/0078227 A1 | 3/2011 | Mcaloon et al. | |
| 2011/0208908 A1* | 8/2011 | Chou | G06F 11/203 718/1 |
| 2011/0314465 A1 | 12/2011 | Smith et al. | |
| 2011/0321041 A1 | 12/2011 | Bhat et al. | |
| 2012/0016840 A1 | 1/2012 | Lin et al. | |
| 2012/0124585 A1 | 5/2012 | Almasi et al. | |
| 2012/0158659 A1* | 6/2012 | Marathe | G06F 16/907 707/639 |
| 2012/0159232 A1 | 6/2012 | Shimada et al. | |
| 2012/0240110 A1 | 9/2012 | Breitgand et al. | |
| 2012/0271797 A1 | 10/2012 | Patil | |
| 2013/0019000 A1 | 1/2013 | Markus et al. | |
| 2013/0054518 A1 | 2/2013 | Anglin et al. | |
| 2013/0110790 A1* | 5/2013 | Matsumoto | G06F 11/1469 707/E17.005 |
| 2013/0144921 A1 | 6/2013 | Nakamura et al. | |
| 2013/0311989 A1 | 11/2013 | Ota et al. | |
| 2014/0229440 A1* | 8/2014 | Venkatesh | G06F 9/45558 707/634 |
| 2014/0244672 A1* | 8/2014 | Molaro | G06F 16/184 707/756 |
| 2014/0380305 A1* | 12/2014 | Oshins | G06F 16/13 718/1 |
| 2015/0213102 A1* | 7/2015 | Chen | G06F 16/275 707/612 |
| 2015/0370657 A1* | 12/2015 | Marakala | G06F 11/1484 714/15 |
| 2016/0105313 A1 | 4/2016 | Jha et al. | |
| 2016/0246683 A1 | 8/2016 | Vijayan et al. | |

FOREIGN PATENT DOCUMENTS

| | | |
|---|---|---|
| WO | 2008112691 A2 | 9/2008 |
| WO | WO2012078347 A2 * | 6/2012 |
| WO | WO2012177445 A2 * | 12/2012 |

OTHER PUBLICATIONS

S. Ataee et al., "ReStream—A Replication Algorithm for Reliable and Scalable Multimedia Streaming", 2013 21st Euromicro International Conference on Parallel, Distributed, and Network-Based Processing (pp. 68-76).*
Petrovic, D et al., "Implementing Virtual Machine Replication: A Case Study Using Xen and KVM", IEEE 26th International Conference on Advanced Information Networking and Applications Mar. 2012 (pp. 73-80).*
Final Office Action dated Mar. 15, 2017 for U.S. Appl. No. 14/496,611, filed Sep. 25, 2014, 20 pages.
International Preliminary Report on Patentabilityfor Application No. PCT/US2015/051228 dated Mar. 28, 2017, 9 pages.
International Search Report and Written Opinion for Application No. PCT/US2015/051228 dated Dec. 22, 2015, 13 pages.
Non-Final Office Action dated Jan. 7, 2022 for U.S. Appl. No. 16/806,083, filed Mar. 2, 2020 16 pages.
Non-Final Office Action dated Nov. 13, 2019 for U.S. Appl. No. 15/820,743, filed Nov. 22, 2017, 17 pages.
Non-Final Office Action dated Oct. 6, 2016 for U.S. Appl. No. 14/496,611, filed Sep. 25, 2014, 12 pages.
Notice of Allowance dated Aug. 8, 2017 for U.S. Appl. No. 14/496,611, filed Sep. 25, 2014, 11 pages.
Notice of Allowance dated Feb. 6, 2020 for U.S. Appl. No. 15/820,743, filed Nov. 22, 2017, 16 pages.

(56) References Cited

OTHER PUBLICATIONS

Notice of Allowance dated May 10, 2022 for U.S. Appl. No. 16/806,083, filed Mar. 2, 2020, 18 pages.

* cited by examiner

```
TABLE QOS_FILE_WORKLOAD "QOS WORKLOAD FOR FILE OBJECT" { } {
    FIELDS {
        VSID                "VSERVER ID"            VSERVERID       KEY[1]
        VOLMSID             "VOLUME MSID (C-MODE)"  UNSIGNED64      KEY[2]
        FILE                "FILENAME"              TEXT            KEY[3]
        UUID                "WORKLOAD UUID"         UUID            READ[4]
        POLICY-GROUP-UUID   "POLICY GROUP UUID"     UUID            READ[5]
    }
    VSERVER-FIELD { VSID }
}
```

FIG. 5

SYNCHRONIZING CONFIGURATION OF PARTNER OBJECTS ACROSS DISTRIBUTED STORAGE SYSTEMS USING TRANSFORMATIONS

RELATED APPLICATIONS

This application claims priority to and is a continuation of U.S. application Ser. No. 16/806,083, filed on Mar. 2, 2020, now allowed, titled "SYNCHRONIZING CONFIGURATION OF PARTNER OBJECTS ACROSS DISTRIBUTED STORAGE SYSTEMS USING TRANSFORMATIONS," which claims priority to and is a continuation of U.S. Pat. No. 10,621,146, filed on Nov. 22, 2017, titled "SYNCHRONIZING CONFIGURATION OF PARTNER OBJECTS ACROSS DISTRIBUTED STORAGE SYSTEMS USING TRANSFORMATIONS," which claims priority to and is a continuation of U.S. Pat. No. 9,836,476, filed on Sep. 25, 2014 and titled "SYNCHRONIZING CONFIGURATION OF PARTNER OBJECTS ACROSS DISTRIBUTED STORAGE SYSTEMS USING TRANSFORMATIONS," which are incorporated herein by reference.

BACKGROUND

Aspects of the disclosure generally relate to the field of distributed storage systems, and, more particularly, to synchronizing configurations of partner objects across the distributed storage system.

A networked storage system is a processing system that is used to store and retrieve data on behalf of one or more hosts on a network. One or more storage controllers in the networked storage system operate on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service extent-level requests from hosts, as with storage controllers used in a storage area network (SAN) environment. Still other storage controllers are capable of servicing both file-level requests and extent-level requests.

A networked storage system can be configured to provide high availability (HA) and disaster recovery (DR) capabilities. In such configurations, two or more storage controllers, typically located at different sites, are used to replicate stored data as well as state information such as NVRAM staged I/O requests. Data received from a host by a first controller can be written to storage devices local to the first storage controller. In addition, the first storage controller can replicate the data on a second storage controller by forwarding the data to a second storage controller. The second storage controller then stores a copy of the data on storage devices local to the second controller. In the event of a failure or other problem with the first controller or the storage attached thereto, the replicated data can be retrieved from storage local to the second controller.

Additional HA and DR capabilities can be implemented with respect to clustered storage controller configurations in the networked storage system. In order to provide such HA and DR capability, configuration data is typically replicated across the cluster. Various issues can cause the configuration data to become out of synch. For example, there may be a power outage, error condition, maintenance outage or other reason that can cause a storage controller to not receive replicated configuration data. The configuration data for the storage controller then becomes stale and out of synch with other controllers in the cluster.

BRIEF DESCRIPTION OF THE DRAWINGS

The aspects of the disclosure may be better understood by referencing the accompanying drawings.

FIG. 5 is an example schema illustrating a tagging feature according to some aspects.

DETAILED DESCRIPTION

Figure 1:
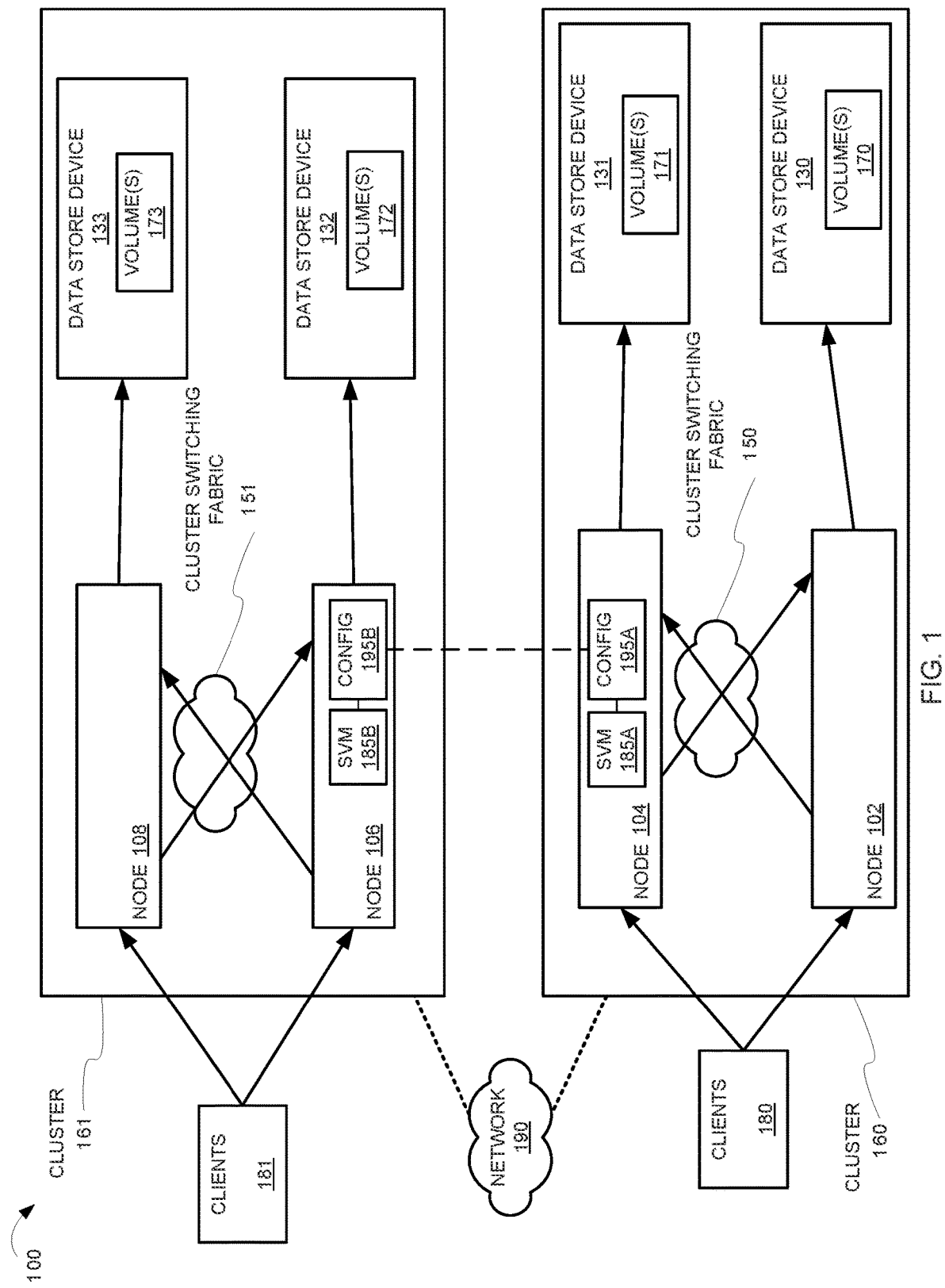
FIG. 1 depicts a distributed storage system having distributed configuration replication, according to some features.

The description that follows includes example systems, methods, techniques, instruction sequences and computer program products that embody techniques of the present inventive subject matter. However, it is understood that the described aspects of the disclosure may be practiced without these specific details. For instance, although examples refer to synchronizing configuration objects for a storage virtual machine (SVM) configuration on a first node to an SVM configuration on a partner node, configuration objects for other components can be synchronized from the first node to the partner node. In other instances, well-known instruction instances, protocols, structures and techniques have not been shown in detail in order not to obfuscate the description.

In some aspects, a configuration for a component of a primary node is synchronized with a configuration for a component of a partner node in a different cluster by replicating the primary node configuration with the partner node. Configuration replication can be done in two phases. The first phase is baseline configuration replication which involves taking a snapshot of a component configuration on the primary node (e.g., an SVM configuration) and creating the same configuration for the component on the partner node. The baseline configuration can be generated by traversing through the configuration objects, capturing their attributes and encapsulating them in a package. The baseline package can then be transferred to the partner node. In some aspects, the configuration objects can be applied on the partner node in the order in which they were captured on the primary node. Attributes of the configuration objects are identified that are to be transformed. Values for the identified attributes are transformed from a name space in the primary node to a name space in the partner node.

The above-described replication of a component configuration from a primary node to a partner node typically cannot be a direct copy of the component configuration. For example, assume that a configuration for an SVM on a primary node is to be replicated on a partner node. The SVM on the primary node and the SVM on the partner node will each have an identifier uniquely identifying the SVM within the cluster. Thus the primary node SVM identifier will differ from the partner node SVM identifier. Configuration objects with the replicated configuration will typically include a field for the identifier. This field may be an integer field, a text string field or a UUID (Universally Unique Identifier) field. Thus in order to ensure that the replicated configuration will be valid on the partner node, fields in configuration objects that are used to identify the SVM are transformed from the primary node name space to the partner node name space.

Once the baseline configuration is applied successfully, the second phase of replication can start where the component configuration on the partner node is synchronized by replicating incremental changes that occur to the component configuration on the primary node. The replication of updates can include name space transformations as described above with respect to the baseline configuration update. The updates can be replicated in the order in which they occur at the primary node. A series of updates from a primary node to a partner node can be referred to as a replication stream. Replicating updates in the order they occur on the primary node is desirable because there may be dependencies between objects being update in a configuration. For example, a volume may be created and a snapshot policy may be associated with the new volume. Each operation can result in generation of a configuration update. The snapshot policy update associating the policy with the volume cannot be implemented before applying the volume creation update that because the volume will not exist when the policy association is attempted.

If there is a discontinuity in the replication stream involving a loss of updates, further updates typically cannot be applied due to the dependency issue described above. The discontinuity may occur for several reasons. It can be unintentional in the case of infrastructure failures, for example a network disconnection, a failure to capture a configuration change on the primary cluster, or a corruption or data loss related to underlying internal storage. Alternatively, the discontinuity can be intentional in the case where the relationship between the primary node and the partner node is intentionally broken off and then re-established. Recovery in such cases can be achieved by reconciling the component configuration on the partner node with the component configuration of the primary node.

Figure 2:
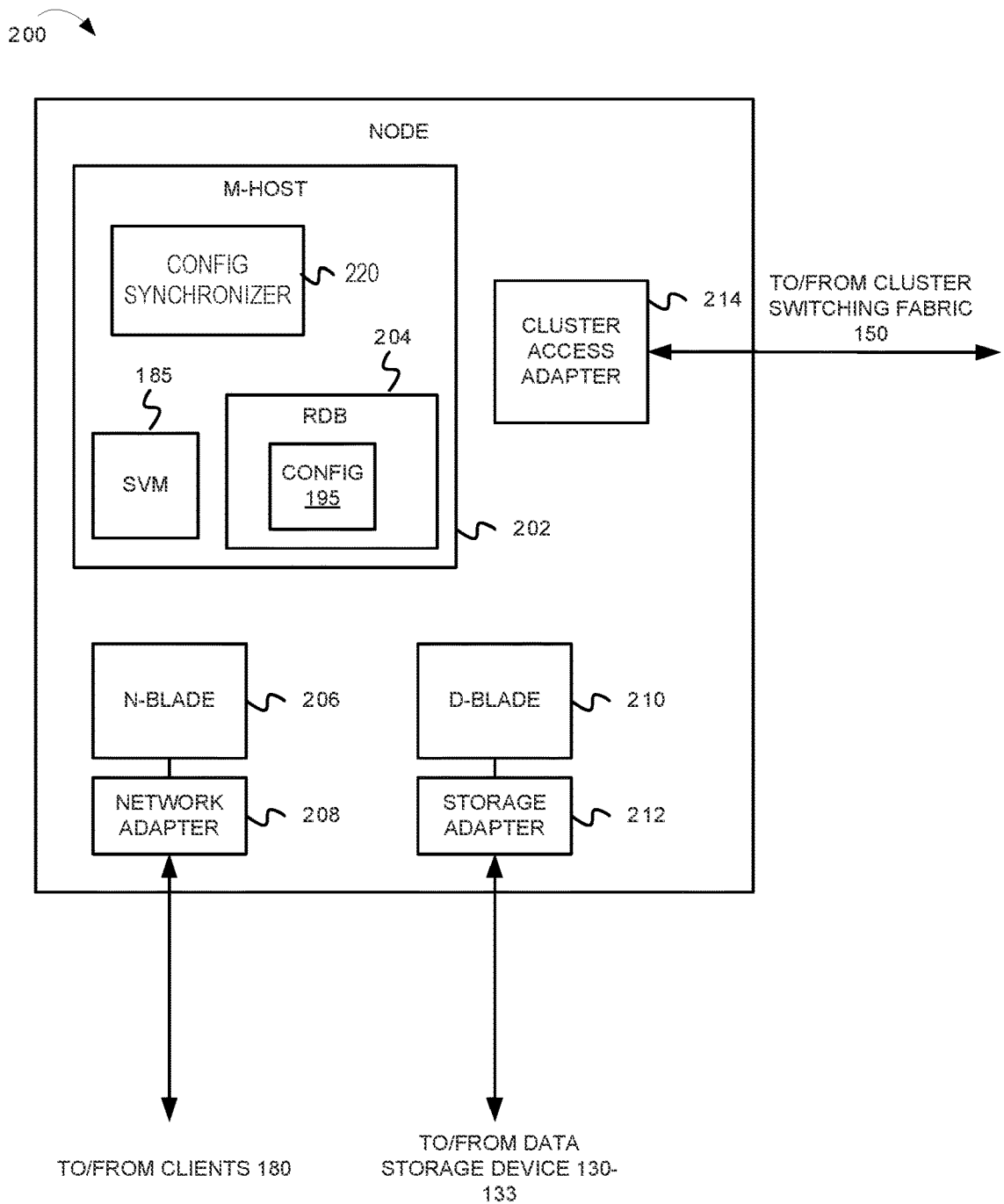
FIG. 2 depicts a block diagram of a node in a distributed storage system, according to some features.

FIG. 1 depicts a distributed storage system having distributed configuration replication, according to some features. FIG. 1 depicts a system 100 that includes multiple clusters (a cluster 160 and a cluster 161). Each cluster can include a number of nodes interconnected that can be configured to provide storage service for data containers or objects (e.g., files) across one or more data volumes. In this example, the cluster 160 includes a node 102 and a node 104 interconnected through a cluster switching fabric 150. The cluster 161 includes a node 106 and a node 108 interconnected through a cluster switching fabric 151. As an example, the cluster switching fabric 150 and the cluster switching fabric 151 can be Gigabit Ethernet switches. The nodes 102-108 include various functional components that cooperate to provide a distributed storage system architecture of the respective clusters. An example of the nodes 102-108 is depicted in FIG. 2, which is described in more detail below.

The nodes 102-104 can be communicatively coupled to clients 180 (e.g., over a network). Similarly, the nodes 106-108 can be communicatively coupled to client 181 (e.g., over a network). The node 102 is communicatively coupled to store and retrieve data into and from a data store device 130. The node 104 is communicatively coupled to store and retrieve data into and from a data store device 131. The node 106 is communicatively coupled to store and retrieve data into and from a data store device 132. The node 108 is communicatively coupled to store and retrieve data into and from a data store device 133.

The clients 180 and the clients 181 may be general-purpose computers configured to interact with the nodes 102-104 and the nodes 106-108, respectively, in accordance with a client/server model of information delivery. That is, each of the clients 180 may request the services of the nodes 102-104, and each of the clients 181 may request the services of the nodes 106-108. The nodes 102-108 may return the results of the services requested by the clients 180-181, by exchanging packets over a network. The clients 180-181 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the clients 180-181 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

According to some features, data store devices 130-133 include volumes, which are components of storage of information in disk drives, disk arrays, and/or other data stores (e.g., flash memory) as a file-system for data, for example. In this example, the data store device 130 includes volume(s) 170. The data store device 131 includes volume(s) 171. The data store device 132 includes volume(s) 172. The data store device 133 includes volume(s) 173. According to some features, volumes can span a portion of a data store, a collection of data stores, or portions of data stores, for example, and typically define an overall logical arrangement of file storage on data store space in the distributed file system. According to some features, a volume can comprise stored data containers (e.g., files) that reside in a hierarchical directory structure within the volume. Volumes are typically configured in formats that may be associated with particular file systems, and respective volume formats typically comprise features that provide functionality to the volumes, such as providing an ability for volumes to form clusters. For example, a first file system may utilize a first format for its volumes, and a second file system may utilize a second format for its volumes.

The volumes can include a collection of physical storage disks cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID configurations, such as a RAID-4 level configuration, enhance the reliability/integrity of data storage through the redundant writing of data "stripes" across a given number of physical disks in the RAID group, and the appropriate storing of parity information with respect to the striped data. An illustrative example of a RAID configuration is a RAID-4 level configuration, although it should be understood that other types and levels of RAID configurations may be used in accordance with some features.

The system 100 also includes a network 190 over which nodes in different clusters can communicate. According to some features, a node in one cluster can be defined as a backup to a node in a different cluster, referred to as a primary node. A backup node may also be referred to as a partner node with respect to the primary node. For example, the node 104 in the cluster 160 can be a primary storage device, and the node 106 in the cluster 161 can be a partner node that provides a backup storage device for the node 102. Therefore, data stored in the data store device 131 can be duplicated in the data store device 132. Accordingly, if the node 104 were to fail or become otherwise nonoperational (e.g., for maintenance), the node 106 can become active to process data requests for data stored in the data store device 132. According to some features, the configuration of a component on node 104 can be replicated on a partner node such as node 106. Some aspects can redundantly create and store initial baseline configurations of one or more components on the partner node 106. The initial baseline for the partner node can be derived from the configuration of one or more components of the primary node 104. Also during operations, any incremental changes to the configuration of components on the primary node can be transmitted to the partner node. The partner node can then update its configuration for the replicated components based on these incremental changes.

According to some aspects, the configuration of the one or more components on the primary node is not directly copied to be the configuration for the backup node. In particular, the primary node and the partner node can be in two different clusters and/or two different networks. Thus, a direct copy of configuration to the partner node can create a conflict with already existing configuration with other storage nodes in the cluster that includes the partner node. Therefore according to some aspects, replication of the configuration to the partner node includes a filtering to replace and/or delete data in the configuration that is specific to the cluster and/or the network to which the primary node belongs.

As noted above, the components of nodes in system 100 can include SVMs. An SVM can contain one or more data volumes and one or more network interfaces for serving data to clients. The attributes of a storage cluster can be virtualized and divided among multiple SVMs. An SVM can securely isolate the shared virtualized data storage and network and can appear as a single dedicated server to its clients. Each SVM can have a separate administrator authentication domain and can be managed independently by an SVM administrator. Also, multiple SVMs can coexist in a single cluster without being bound to any node in a cluster. However, the SVMs can be bound to the physical cluster on which they exist.

In the example illustrated in FIG. 1, node 104 includes SVM 185A. SVM component 185A on node 104 is replicated as SVM component 185B on node 106. Similarly, the configuration 195A for SVM 185A is replicated as configuration 195B on node 106. An SVM will be generically referred to as SVM 185. SVM 185A and SVM 185B may be in a partner relationship such that SVM 185A is a primary SVM and SVM 185B is a partner SVM that can be used in the case of a failover situation. For example, if node 104 experiences a failure causing SVM 185A to become inoperable, the functions performed by SVM 185A can be transferred to SVM 185B.

A component configuration (e.g., configurations 195A and 195B) will be generically referred to as a configuration 195. A configuration for a component on a primary node may be referred to as a primary configuration or a baseline configuration. A configuration for the component that is replicated on a partner node may be referred to as a partner configuration. Thus in the example illustrated in FIG. 1, configuration 195A can be a baseline configuration and configuration 195B can be a partner configuration. A configuration 195 for the component may comprise configuration objects. The configuration objects may be data structures that have fields or attributes that can be assigned values. A configuration object that is to be replicated from a primary node (e.g., node 102) to a partner node (e.g., node 104) can be referred to as a primary configuration object or a baseline configuration object. A configuration object that is replicated on the partner node from the primary configuration object will be referred to as a partner configuration object.

FIG. 2 depicts a block diagram of a node in a distributed storage system, according to some features. In particular, FIG. 2 depicts a node 200 which can be representative of any of the nodes 102-108 of FIG. 1. The node 200 includes a network adapter 208, a cluster access adapter 214, a storage adapter 212, a network module 206, a data module 210, and a management module 202.

The network module 206, the data module 210, and the management module 202 can be hardware, software, firmware, or a combination thereof. For example, the network module 206, the data module 210, and the management module 202 can be software executing on a processor of node 200. Alternatively, the network module 206, the data module 210, and the management module 202 can each be independent hardware units within node 200, with each having their own respective processor or processors. The network module 206 includes functionality that enables the node 200 to connect to clients over a network. The data module 210 includes functionality to connect to one or more storage devices (e.g., data store devices 130-133). It should be noted that while there is shown an equal number of network modules and data modules in the illustrative cluster, there may be differing numbers of network modules and/or data modules in accordance with some features. The management module 202 can include functionality for managing the node 200. For example, the management module 202 can include functionality to update configuration of the node 200 and its associated data store device. Operations for updating the configuration of a component such as SVM 185 on the node 200 and its associated data store device are depicted in FIGS. 4-7 which are described in more detail below.

Each node 200 can be embodied as a single or dual processor storage system executing a storage operating system that implements a high-level module, such as a file system, to logically organize the information as a hierarchical structure of named directories, files and special types of files called virtual disks (or generally "objects" or "data containers") on the disks. One or more processors can execute the functions of the network module 206, while another processor(s) can execute the functions of the data module 210.

The network adapter 208 includes a number of ports adapted to couple the node 200 to one or more clients 180 over point-to-point links, wide area networks, virtual private networks implemented over a public network (Internet) or a shared local area network. The network adapter 208 thus may include the mechanical, electrical and signaling circuitry needed to connect the node 200 to the network. Illustratively, the network may be embodied as an Ethernet network or a Fibre Channel (FC) network. Each client 180 may communicate with the node 200 by exchanging discrete frames or packets of data according to pre-defined protocols, such as TCP/IP.

The storage adapter 212 can cooperate with a storage operating system executing on the node 200 to access information requested by the clients. The information may be stored on any type of attached array of writable storage device media such as optical, magnetic tape, magnetic disks, solid state drives, bubble memory, electronic random access memory, micro-electro mechanical and any other similar media adapted to store information, including data and parity information. The storage adapter 212 can include a number of ports having input/output (I/O) interface circuitry that couples to the disks over an I/O interconnect arrangement, such as a conventional high-performance, FC link topology.

Management module 202 can include functionality for an SVM 185 and can include a replicated database (RDB) 204 and a configuration synchronizer 220. RDB 204 can be a database that stores configuration objects and relationships between configuration objects in a configuration 195. For example, RDB 204 can store configuration objects related to the configuration of SVM 185. Additionally, RDB 204 can store volume configurations, aggregate configurations, storage configurations, policies, etc.

In addition, RDB 204 can store schemas related to the configuration objects. The schemas can define attribute labels (also referred to as attribute names or field names), attribute types, attribute metadata, and tags for configuration objects. An example of a schema according to aspects of the disclosure is described in further detail below with respect to FIG. 5.

Configuration synchronizer 220 synchronizes performs configuration synchronization for a node 200. For example, on a primary node (e.g., node 102 of FIG. 1), configuration synchronizer 220 can generate a baseline configuration for a component (e.g., an SVM 185A of FIG. 1) on the primary node and transmit the baseline configuration to a partner node. Configuration synchronizer 220 can transmit subsequent updates to the component configuration on the primary node to the partner node as part of a replication stream between the primary node and the partner node.

On a partner node (e.g., node 106 of FIG. 1), configuration synchronizer 220 can receive the baseline configuration for the component on the primary node and synchronize the configuration for the partner component on the partner node (e.g., node 106 of FIG. 1). Configuration synchronizer 220 on a partner node can apply subsequent updates received from the primary node. In addition, in the event of a disruption to the replication stream, configuration synchronizer 220 can perform operations described in further detail below to bring a component configuration on the partner node back into synchronization with a component configuration on a primary node.

While FIG. 2 shows the configuration synchronizer 220 as residing in the management module 202, in alternative aspects, the configuration synchronizer may located in other modules. For example, the configuration synchronizer can be located in an administrative unit for a cluster.

Figure 3:
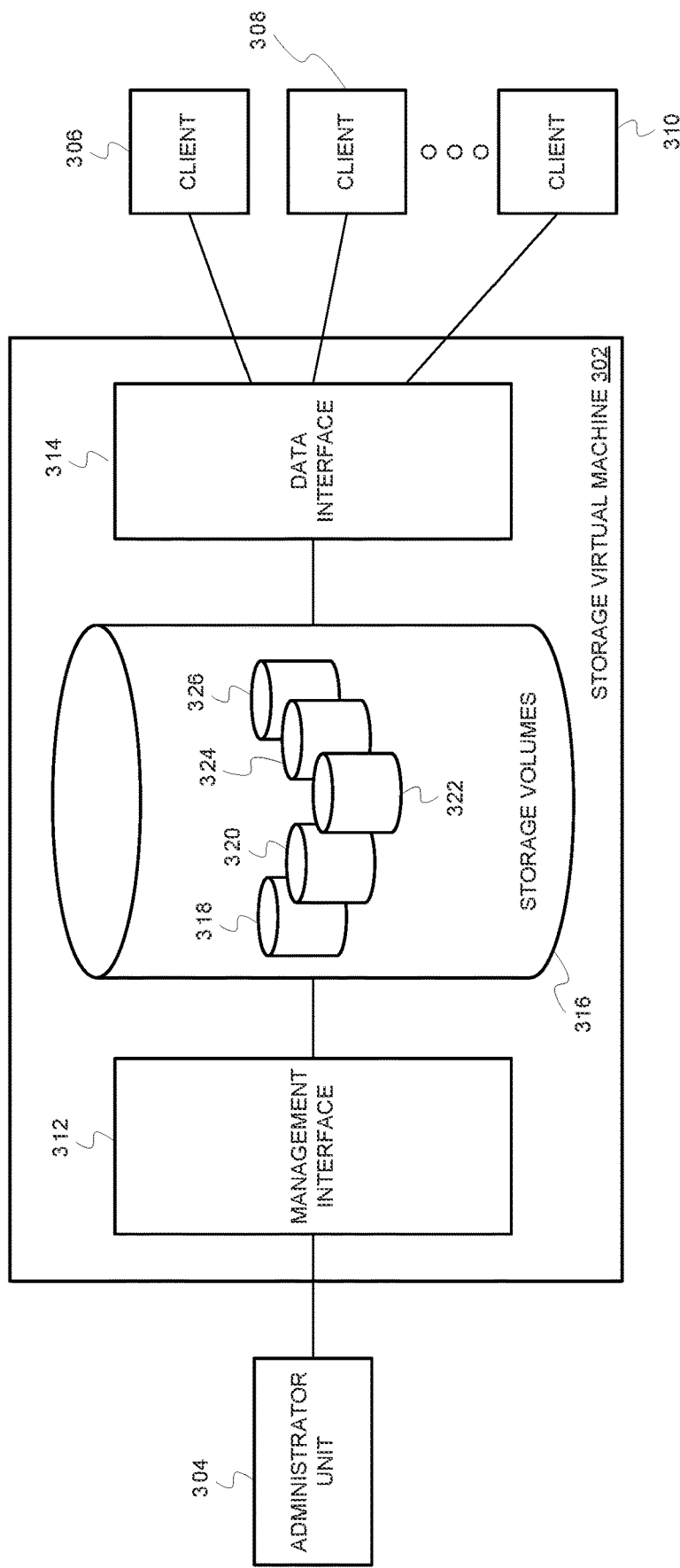
FIG. 3 depicts a block diagram of an example storage virtual machine, according to some features.

FIG. 3 depicts a block diagram of an example SVM, according to some features. A SVM 302 can include a number of storage volumes 316 (e.g., a storage volume 318, a storage volume 320, a storage volume 322, a storage volume 324, and a storage volume 326) storing client data and associated metadata. The SVM 302 can include a management interface 312 and a data interface 314. The SVM 302 can serve data to clients 306-310 through the data interface 314. The data interface 314 can represent one or more types of interfaces to allow the clients 306-310 to write to and read data from the SVM 302. For example, the data interface 314 can be configured to process interface requests according to the CIFS protocol or NFS protocol, over the Transmission Control Protocol/Internet Protocol (TCP/IP) when accessing information in the form of files and directories, internet Small Computer System Interface (iSCSI), etc.

The SVM 302 provides a virtualized data storage that can be shared by multiple clients (the clients 306-310). Thus, the SVM 302 securely isolates the shared virtualized data storage and network and appears as a single dedicated server to its clients. The SVM 302 can include a separate administrator authentication domain and can be managed independently by an SVM administrator. In this example, an administrator unit 304 can manage the SVM 302 through the management interface 312. Multiple SVMs can coexist in a single cluster without being bound to any node in the cluster. However, the SVMs can be bound to the physical cluster on which they exist.

Figure 4:
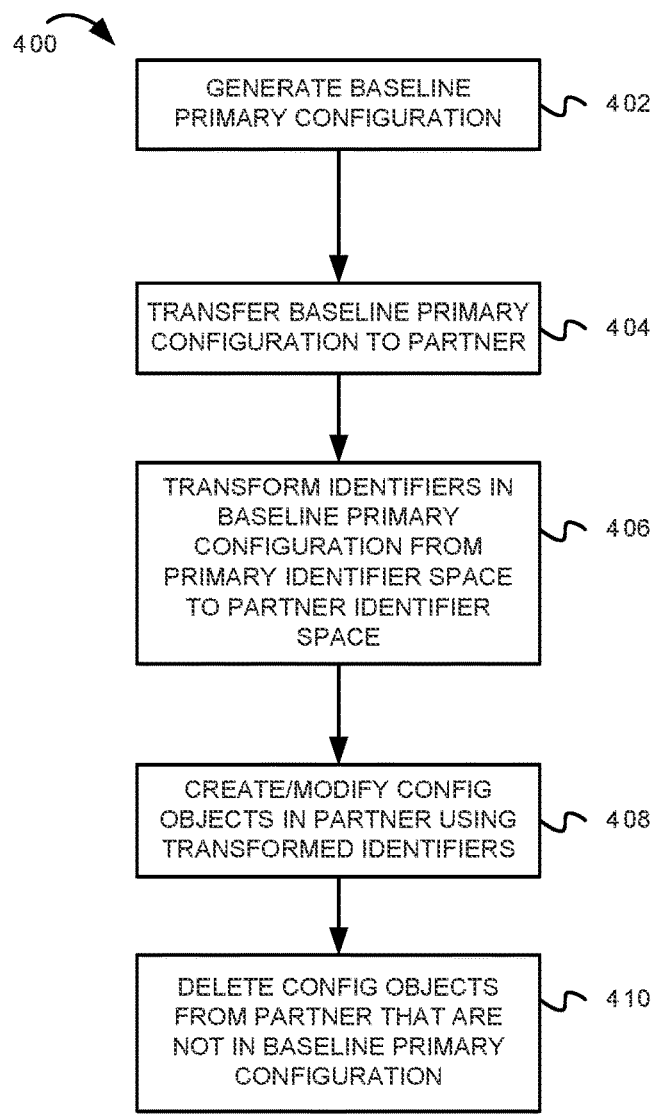
FIG. 4 is a flowchart illustrating operations for replicating a configuration across nodes in different cluster according to some features.

FIG. 4 is a flowchart 400 illustrating example operations of a method for replicating a configuration across nodes in different clusters according to some features. The example operations illustrated in FIG. 4 may be implemented on a node (e.g. nodes 102-108, FIG. 1). According to some features, the example operations may be implemented by a configuration synchronizer 220 on a management module 202 (FIG. 2).

At block 402, a primary node generates a baseline primary configuration. According to some features, the baseline primary configuration may include configurations objects for a SVM. The configuration objects can include data describing volumes, interfaces, policies etc. accessed by the SVM. Some aspects traverse the configuration in an ordered manner such that configuration objects that are dependent on other configuration objects are added to the baseline primary configuration following addition of the object they depend on. Further, some aspects lock the configuration objects during the traversal in order to prevent changes. Such locking is advantageous because it provides data consistency in the baseline primary configuration.

At block 404, a copy of the baseline primary configuration is transferred by the primary node to a partner node of the primary node. The transfer may take place via any communication mechanism coupling the primary node to the partner node. In some aspects the primary node transmits the baseline primary configurations using cluster switching fabric 150. In alternative aspects, network 190 may be used.

At block 406, the partner node receives the baseline primary configuration and transforms identifiers in the baseline primary configuration from an identifier space of the primary node to an identifier space of the partner. As indicated above, a configuration object can include different types of identifiers. For example, an identifier may be a name comprising a string of text, an integer, or a UUID. In some instances, the identifiers for the primary and partner nodes can be different. For example, an identifier in an object that associates the object with a particular SVM will be different for different SVMs. In such cases, the identifier can be transformed by replacing the text string, integer or UUID that refers to a primary SVM with an identifier that refers to the partner SVM. As an example, consider an SVM on a primary node, where the SVM has the identifier "SVM1." Further assume that an SVM on a partner node for the primary node has the identifier "SVM2." One or more volumes may be associated with SVM on the primary node. Configuration objects for volumes can include an SVM identification field associating the volume with an SVM. The configuration objects for volumes associated with the SVM on the primary node will have a value of "SVM1" for the SVM identification field. During configuration replication, the identification field values for the configuration objects in the partner node can be transformed to have the value "SVM2" such that the replicated configuration object (and thus the volume associated with the configuration object) is associated with the correct SVM on the partner node.

As can be appreciated, object attributes that contain identifiers may have different labels and different data types for different object types. Thus in some aspects, a fieldname for an attribute that contains an identifier that is to be transformed is provided with a tag in the configuration schema for the object. The tag may be used to identify the field or fields in the schema that are to be transformed from an identifier in a primary node identifier space to an identifier in a partner node identifier space.

FIG. 5 illustrates an example object schema 500 having a tag indicating a field to be transformed as described above. In the above example shown in FIG. 5, a vsID field 502 is indicated as the field to be transformed using tag 504. A schema compiler (not shown) can convert the field name to its index and stores the index as a property of the qos-file-workload object. A configuration synchronizer on a management module of the partner cluster can retrieve the vsID attribute of the partner SVM and can transform the value of the vsID field in the qos-file-workload object before applying it to the partner configuration.

The configuration synchronizer can then access the schema to determine which object attributes are to be transformed. In some aspects, the tag is interpreted and converted to an index that is included as an object property.

During transformation operations, the configuration synchronizer can dynamically determine the data type of the identifier to be transformed and use the data type to perform the appropriate transformation. Thus different transformations can be applied depending on whether the identifier to be transformed is a text string, an integer, a UUID etc.

Returning to FIG. 4, at block 408, the baseline primary configuration is traversed to identify objects that have been created or modified in the primary configuration since a previous replication. The identified objects are created or modified in the partner configuration. Further details on operations associated with the create/modify pass are provided below with reference to FIG. 6.

At block 410, the baseline primary configuration is traversed to identify objects that have been deleted from the primary configuration since a previous replication. Such objects are deleted from the partner configuration. Further details on operations associated with the delete pass are provided below with reference to FIG. 7.

After blocks 402-410 have been completed, the partner configuration can be substantially synchronized with the primary configuration.

Figure 6:
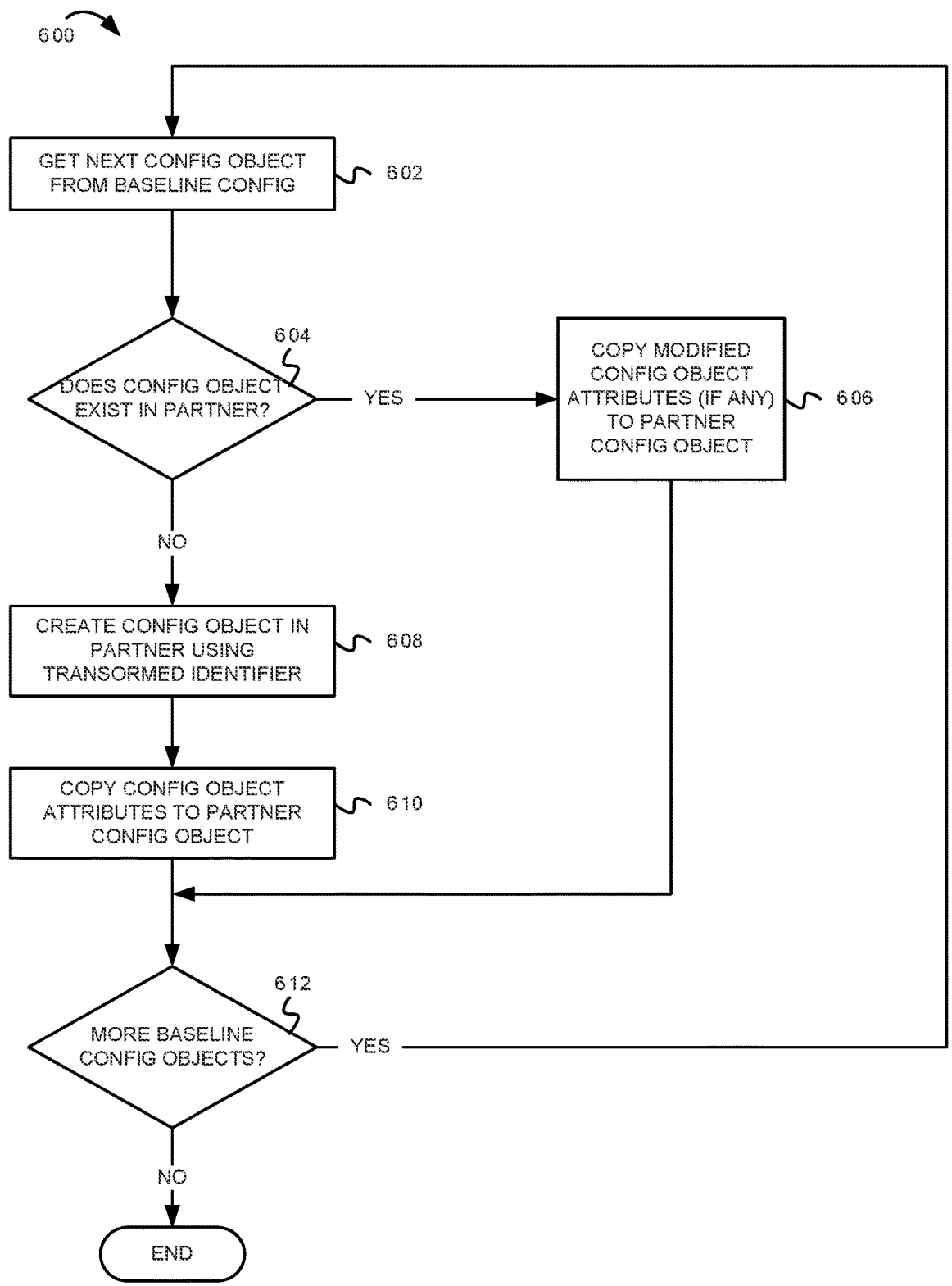
FIG. 6 is a flowchart illustrating operations for creating configuration objects according to some features.

FIG. 6 is a flowchart 600 illustrating operations for creating configuration objects according to some features. The operations described in FIG. 6 provide further details regarding the create/modify pass at block 408 of FIG. 4.

At block 602, a configuration object is accessed from the primary baseline configuration.

At block 604, a check is made to determine if the accessed configuration object is currently in the partner configuration. In some aspects, the check may compare a specified set of key attributes of the primary configuration object and the partner configuration object to determine if there is a match.

If the specified set of key values match, then the object exists in the partner configuration. At block 606, any modified attribute values from the baseline primary configuration can be copied to the partner configuration. The method then proceeds to block 612 to determine if any further configuration objects remain in the baseline configuration.

If the check at block 604 determines that the current baseline primary configuration object does not exist in the partner configuration, then at block 608, a configuration object is created and at block 610, the object attributes of the current baseline primary configuration object are copied to the newly created partner configuration object. In some aspects, before creating a configuration object for the partner configuration, the configuration synchronizer may determine if the primary configuration object should not be replicated in the partner component. For example, there can be default configuration objects associated with an SVM that is generated as part of SVM creation and thus does not need to be explicitly replicated. Additionally, there can be transient configuration objects such as a temporary volume created as part of volume move operation from one aggregate to another aggregate. Such temporary configuration objects may not be replicated in the partner component configuration. Further, certain types of configuration objects may not be replicated due to system limitations. For example, in some aspects, a configuration object may represent a data protection volume that is already in a data protection relationship at a primary SVM that precludes replication of the relationship to a partner SVM.

At block 612, a check is made to determine if there are more configuration objects in the baseline configuration. If so, the method then returns to block 602 to get the next baseline primary configuration object to consider. Otherwise the method terminates.

Figure 7:
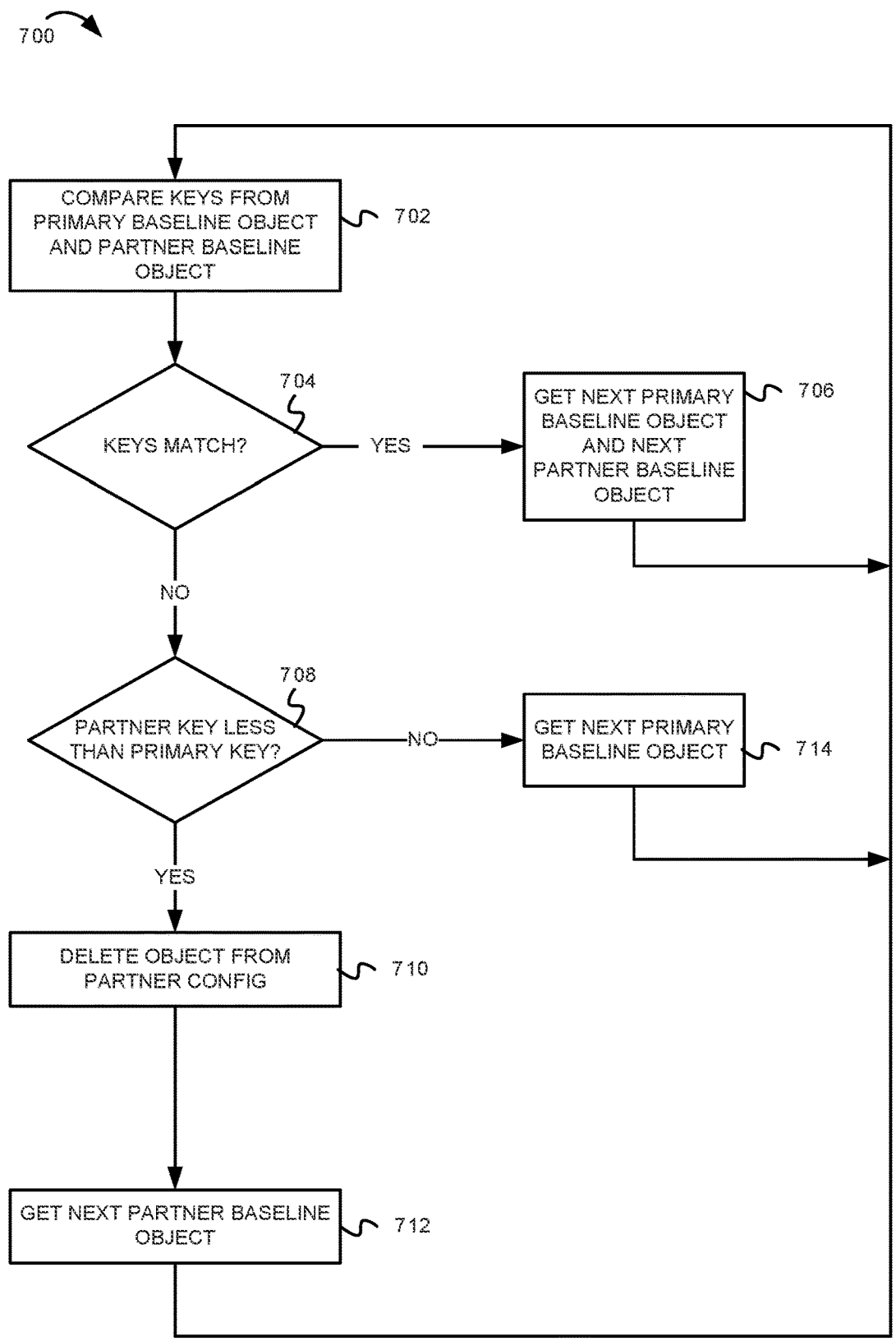
FIG. 7 is a flowchart illustrating operations for deleting configuration objects according to some features.

FIG. 7 is a flowchart 700 illustrating operations for deleting configuration objects according to some features. The operations described in FIG. 7 provide further details regarding the delete pass at block 410 of FIG. 4. In some aspects, the baseline primary configuration and the baseline partner configuration are traversed to compare objects in the two configurations. In some aspects, the traversal is performed in reverse order.

For example, the configuration synchronizer 220 may traverse objects in the reverse order in which they were created. This can be desirable in order to satisfy dependencies between objects. For example, a volume with a specific snapshot policy cannot be created unless the policy itself is created prior to the volume creation. Thus, in the baseline configuration, a configuration object for the snapshot policy is created before the configuration object for the associated volume. However, a snapshot policy cannot be deleted if it is in use by a volume. Thus a volume that depends on a snapshot policy is deleted before snapshot policy deletion. Thus, in some aspects, the order of object traversal during the delete pass is reversed from the order in the create pass.

At block 702, one or more key values for a current primary baseline configuration object are compared to one or more key values for a current partner baseline configuration object. The key comparison can involve a string comparison for text based identifiers or an integer comparison for integer based identifiers. Key values that comprise UUIDs can be compared byte-by-byte.

At block 704, a check is made to determine if the key values match. If the key values match, then no action is performed with respect to the partner configuration object. The method proceeds to block 706 to obtain the next primary baseline configuration object and the next partner baseline configuration object before returning to block 702.

If the check at block 704 determines that the key values do not match, then at block 706 a check is made to determine if the key values of the partner baseline configuration object are less than the key values of the primary baseline configuration object.

If the check at block 708 determines that the partner key values are less than the primary key values, then at block 710, the method deletes the current object from the partner configuration. The object is deleted because the partner object does not exist in the baseline primary configuration. In order to synchronize the two configurations, the partner object is deleted.

At block 712, the method obtains the next partner configuration object and returns to block 702 to compare the next partner configuration object to the current partner configuration object.

If the check at block 708 determines that the partner key values are not less than the primary key values (i.e., the partner key values are greater than the primary key values), then at block 714 the method gets the next primary baseline object and proceeds to block 702 to compare the next primary baseline object with the current partner object. The method proceeds with the next primary object because it can be assumed that the current primary object was dropped from being replicated.

For example, as discussed above, an object may not be replicated if the object is part of a default configuration associated with an SVM. Such default configuration objects can be generated as part of SVM creation and thus need not be replicated. Alternatively, there can be transient configuration objects such as a temporary volume created as part of volume move operation from one aggregate to another aggregate. Further, as noted above, there can be certain types of configuration objects are may not be replicated due to system limitations. As will be appreciated by one skilled in the art, aspects of the disclosure may be included in a system, method or computer program product. Accordingly, aspects of the disclosure may take the form of entirely hardware, entirely software (including firmware, resident software, micro-code, etc.) or a combination of software and hardware that may all generally be referred to herein as a "circuit," "module" or "system." Furthermore, aspects of the disclosure may take the form of a computer program product included in one or more machine readable medium(s) having machine readable program code included thereon.

Any combination of one or more machine readable medium(s) may be utilized. The machine readable medium may be a machine readable signal medium or a machine readable storage medium. A machine readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the machine readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
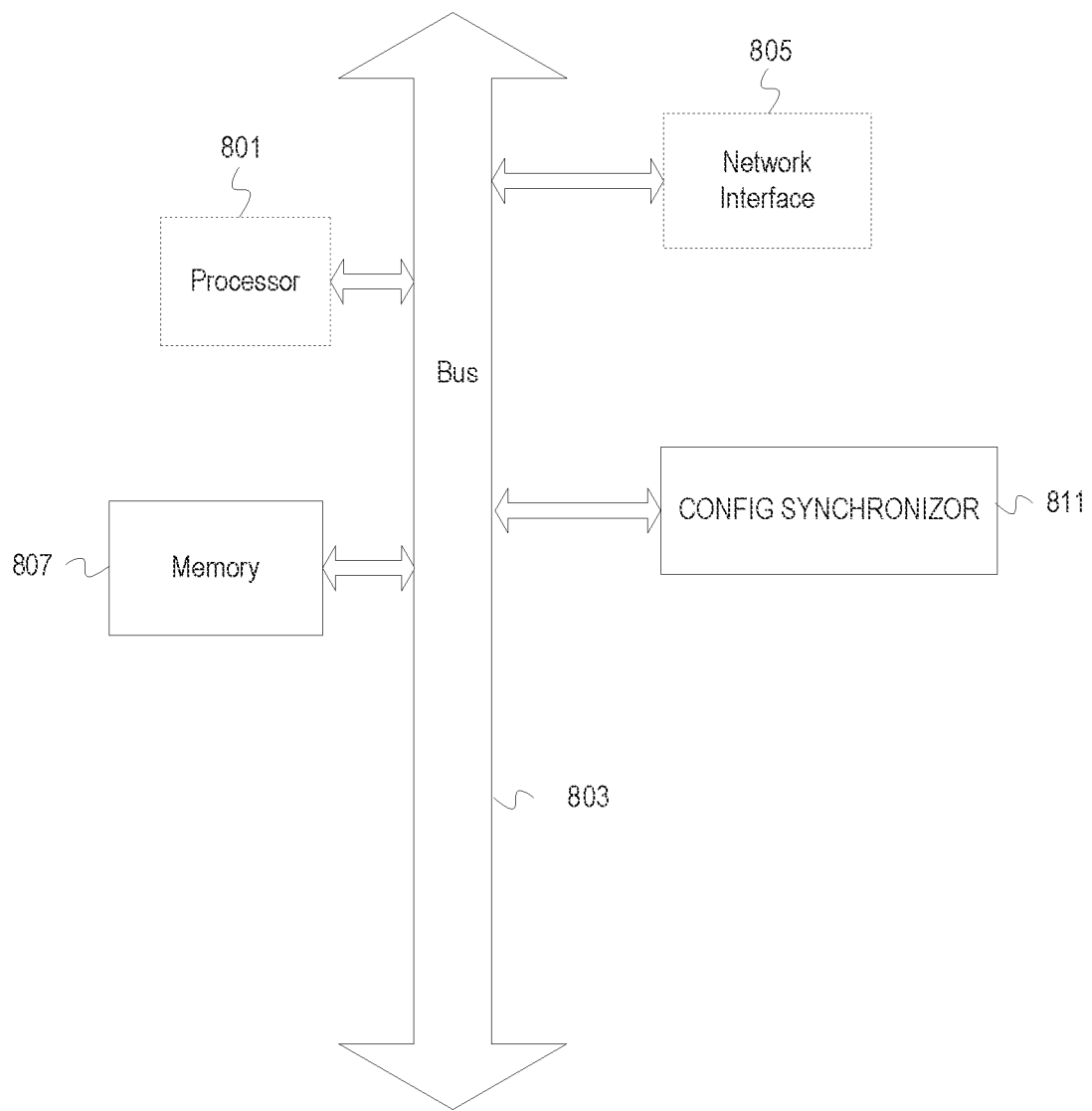
FIG. 8 depicts an example computer system with a configuration synchronizer.

FIG. 8 depicts an example computer system with a storage cluster based full sync and semi sync propagation engine. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine readable media. The computer system also includes a bus 803 (e.g., PCI, ISA, PCI-Express, HyperTransport® bus, InfiniBand® bus, NuBus, etc.), and a network interface 805 (e.g., an ATM interface, an Ethernet interface, a Frame Relay interface, SONET interface, wireless interface, iSCSI, Fibre Channel, etc.). The computer system also includes a configuration synchronizer 811. The configuration synchronizer 811 synchronizes a component configuration that is replicated from a primary node to a partner node as described above. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the inventive subject matter is not limited to them. In general, techniques for replicating configuration objects across nodes in different cluster having different identifier spaces as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    performing a baseline configuration replication during a first phase of a two phase replication, wherein a baseline package capturing attributes of configuration objects of a primary virtual machine at a primary node is created and replicated to a partner node as a baseline configuration;
    performing a second phase of the two phase replication by:
        creating a replication stream to comprise a series of updates performed upon a component configuration by the primary node; and
        transmitting the replication stream to the partner node to apply to a corresponding component configuration on the partner node;
    evaluating the replication stream to detect a discontinuity in the replication stream involving a loss of updates, wherein the discontinuity is detected based upon a determination that there was a failure to capture a configuration change on the primary node; and
    reconciling the corresponding component configuration on the partner node with the component configuration of the primary node to recover from the discontinuity.

2. The method of claim 1, wherein the replication stream captures the series of updates in an order with which the series of updates occurred at the primary node for preserving dependencies between a set of configuration objects in the component configuration.

3. The method of claim 1, comprising:
    detecting the discontinuity in the replication stream based upon the loss of the updates within the replication stream.

4. The method of claim 1, comprising:
    refraining from applying subsequent updates based upon identifying a dependency issue resulting from the discontinuity in the replication stream.

5. The method of claim 1, comprising:
    detecting the discontinuity in the replication stream based upon a network disconnection.

6. The method of claim 1, comprising:
    traversing the configuration objects for inclusion within the baseline package according to an order where a first configuration object dependent upon a second configuration object is added to the baseline package after the second configuration object is added to the baseline package based upon the first configuration object depending upon the second configuration object.

7. The method of claim 1, comprising:
    detecting the discontinuity in the replication stream based upon a break and subsequent re-establishment of a relationship between the primary node and the partner node.

8. The method of claim 6, comprising:
    locking the configuration objects during the traversal to prevent changes to the configuration objects and provide data consistency in the baseline package.

9. The method of claim 1, wherein performing the baseline configuration comprises:
    applying configuration objects captured by the baseline package to the partner node is an order in which the configuration were captured by the primary node.

10. The method of claim 1, wherein performing the baseline configuration comprises:
    identifying one or more attributes of the configuration objects that are to be transformed; and
    transforming the one or more attributes from a name space of the primary node to a name space of the partner node.

11. The method of claim 1, comprising:
    identifying a temporary configuration object at the primary node; and
    excluding, by the two phase replication, the temporary configuration object from being replicated to the partner node for including within the corresponding component configuration on the partner node.

12. The method of claim 1, comprising:
    excluding, by the two phase replication, a configuration object from being replicated to the partner node for including within the corresponding component configuration on the partner node based upon a system limitation.

13. The method of claim 1, comprising:
identifying a default configuration object at the primary node; and
excluding, by the two phase replication, the default configuration object from being replicated to the partner node for including within the corresponding component configuration on the partner node.

14. The method of claim 1, comprising:
excluding, by the two phase replication, a configuration object from being replicated to the partner node for including within the corresponding component configuration on the partner node based upon the configuration object representing a data protection volume having an existing data protection relationship.

15. A computing device comprising:
a memory comprising machine executable code; and
a processor coupled to the memory, the processor configured to execute the machine executable code to cause the processor to:
perform a baseline configuration replication during a first phase of a two phase replication, wherein a baseline package capturing attributes of configuration objects of a primary virtual machine at a primary node is created and replicated to a partner node as a baseline configuration;
perform a second phase of the two phase replication by:
creating a replication stream to comprise a series of updates performed upon a component configuration by the primary node; and
transmitting the replication stream to the partner node to apply to a corresponding component configuration on the partner node;
evaluate the replication stream to detect a discontinuity in the replication stream involving a loss of updates, wherein the discontinuity is detected based upon a determination that there was a failure to capture a configuration change on the primary node; and
reconcile the corresponding component configuration on the partner node with the component configuration of the primary node to recover from the discontinuity.

16. The computing device of claim 15, wherein the replication stream captures the series of updates in an order with which the series of updates occurred at the primary node for preserving dependencies between a set of configuration objects in the component configuration.

17. The computing device of claim 15, wherein the machine executable code causes the processor to:
detect the discontinuity in the replication stream based upon the loss of the updates within the replication stream.

18. The computing device of claim 15, wherein the machine executable code causes the processor to:
refraining from applying subsequent updates based upon identifying a dependency issue resulting from the discontinuity in the replication stream.

19. The computing device of claim 15, wherein the machine executable code causes the processor to:
traversing the baseline configuration to identify objects that have been created or modified since a previous replication; and
creating or modifying the objects within the corresponding component configuration on the partner node.

20. A non-transitory machine readable medium comprising instructions for performing a method, which when executed by a machine, causes the machine to:
perform a baseline configuration replication during a first phase of a two phase replication, wherein a baseline package capturing attributes of configuration objects of a primary virtual machine at a primary node is created and replicated to a partner node as a baseline configuration;
perform a second phase of the two phase replication by:
creating a replication stream to comprise a series of updates performed upon a component configuration by the primary node; and
transmitting the replication stream to the partner node to apply to a corresponding component configuration on the partner node;
evaluate the replication stream to detect a discontinuity in the replication stream involving a loss of updates, wherein the discontinuity is detected based upon a determination that there was a failure to capture a configuration change on the primary node; and
reconcile the corresponding component configuration on the partner node with the component configuration of the primary node to recover from the discontinuity.

\* \* \* \* \*